US006487988B1

(12) United States Patent
Good et al.

(10) Patent No.: US 6,487,988 B1
(45) Date of Patent: Dec. 3, 2002

(54) AGITATOR APPARATUS FOR HOUSED POULTRY

(76) Inventors: J. Stephen Good, 1415 Lime Valley Rd., Lancaster, PA (US) 17602; Philip H. Good, 1259 Lime Valley Rd., Lancaster, PA (US) 17602

( * ) Notice: Subject to any disclaimer, the term of this patent is extended or adjusted under 35 U.S.C. 154(b) by 0 days.

(21) Appl. No.: 09/861,441

(22) Filed: May 21, 2001

(51) Int. Cl.$^7$ ................................................ A01K 1/00
(52) U.S. Cl. ...................... 119/57.2; 119/845; 119/713; 198/678.1
(58) Field of Search .............................. 119/57.2, 57.7, 119/721, 845, 713, 704; 104/91, 93, 115, 117.1; 16/87 R; 198/469.1, 678.1, 684, 685; 452/185, 188

(56) References Cited

U.S. PATENT DOCUMENTS

| | | | |
|---|---|---|---|
| 1,912,647 A | * | 6/1933 | Lemmon ..................... 118/500 |
| 2,678,718 A | * | 5/1954 | Black ......................... 198/684 |
| 2,823,409 A | * | 2/1958 | Allred ......................... 104/93 |
| 3,380,113 A | * | 4/1968 | Zebarth et al. ............. 198/633 |
| 3,563,363 A | * | 2/1971 | Harben et al. .............. 198/680 |
| 3,681,542 A | * | 8/1972 | Johnson ....................... 104/89 |
| 3,805,741 A | * | 4/1974 | Thompson et al. ...... 119/14.04 |
| 3,858,518 A | | 1/1975 | Nyman ....................... 104/124 |
| 4,006,714 A | * | 2/1977 | Goosen |
| 4,100,822 A | | 7/1978 | Rosman ...................... 104/178 |
| 4,167,153 A | | 9/1979 | Markum .................... 119/51 R |
| 4,195,725 A | * | 4/1980 | Jones .......................... 198/716 |
| 4,212,384 A | | 7/1980 | Grube ......................... 198/684 |
| 4,304,194 A | | 12/1981 | Boykin II, et al. ......... 119/51 R |
| 4,313,397 A | | 2/1982 | Markum ....................... 119/29 |
| 4,557,368 A | | 12/1985 | Alameda ..................... 198/313 |
| 5,076,212 A | | 12/1991 | Thompson .................... 119/22 |
| 5,108,345 A | | 4/1992 | Harben et al. .............. 452/182 |
| 5,453,045 A | | 9/1995 | Hobbel et al. .............. 452/182 |
| 5,533,632 A | * | 7/1996 | Patterson et al. ......... 198/678.1 |
| 5,964,354 A | * | 10/1999 | Skinner .................... 198/465.4 |
| 5,971,131 A | * | 10/1999 | Blattner et al. ......... 198/349.95 |
| 5,979,599 A | * | 11/1999 | Noles ............................ 182/3 |

* cited by examiner

Primary Examiner—Yvonne R. Abbott
(74) Attorney, Agent, or Firm—Miller Law Group PLLC (57) ABSTRACT

A poultry agitator is operable for use in conjunction with long rectangular confined poultry houses equipped with a flow-through ventilation system. The agitator imitates the action of a human moving through a congregation of birds to encourage the birds to exercise, feed and intake water. The agitator is formed as a continuous cable that is supported in a circumferential route around the poultry house. The cable is entrained around a drive wheel that is operable to circulate the flexible cable and the agitator members attached thereto. A stop mechanism halts the movement of the agitator members near the end of the building and effects a reversal of the direction of operation of the drive wheel to cause the agitator to be returned to the initial home position. The cable is supported from spaced hangers without the need for massive support beam structure to carry the agitator along its path of travel along the side walls of the poultry house. The agitator is clamped on the cable to move therewith. The agitator is formed as an elongated frame having a target supported near the floor of the poultry house. A programmable control is operable to time the movement of the agitator without operator intervention.

19 Claims, 5 Drawing Sheets

AGITATOR APPARATUS FOR HOUSED POULTRY

BACKGROUND OF THE INVENTION

This invention relates generally to device for encouraging housed poultry to be active and, more particularly, to an agitator driven by a continuous cable drive mechanism to move poultry within a housing structure to enhance feed consumption and promote healthier birds.

Poultry raised in confined areas have a restricted amount of room in which to move around. As the birds grow and become larger, the amount of room becomes even more restricted. It has been found that walking through the confined housing encourages the birds to move around. A number of devices have been devised to simulate a human's movement through the confined area, including U.S. Pat. Nos. 4,304,194 and 4,313,397. Other prior art devices have utilized targets to encourage the birds to move from one area to another, including U.S. Pat. Nos. 4,167,153 and 5,076,212. Movement of confined poultry results in increased food consumption and, therefore, weight for the birds. Furthermore, movement also gives the birds needed exercise to strengthen muscles and promote healthy growth.

Some modern poultry houses are constructed with a ventilation system that directs the flow of fresh air from one end of the long rectangular building to the other, creating a tunnel effect. This flow-through ventilation system tends to urge the birds to migrate to the side walls of the building where less air is being moved. The congregation of large numbers of the birds creates a significant build-up of heat energy and results in suffocation of the birds. Since the watering and feeding systems for the birds are positioned through the building, the congregation of the birds at the side walls prevents the majority of the birds from reaching either food or water, thus hampering growth and promoting sickness in the flock. The known prior art devices attempt to keep the birds more homogeneously distributed throughout the building.

The drive mechanisms for the agitator devices identified above generally utilize tracks or channels on which the devices are mounted for movement through the building. In U.S. Pat. No. 4,167,153, the drive mechanism is an electric motor mounted directly on the agitator and supported in a channel-shaped rail having a drive mechanism housed therein to cause the baffle to be moved around the poultry house. This channel-shaped rail needs to be of substantive mass to support the weight of the motor and associated baffle structure. Placing such a massive structure in a modem poultry house which can be hundreds of feet long is cost prohibitive.

Similarly, the drive mechanism in U.S. Pat. No. 5,076,212 includes a substantial pipe supported fore-and-aft through the length of the poultry house. The carrier is connected to a flexible cable that is wound on a spool that drives the carrier back and forth along the length of the poultry house. As with the drive mechanism of the U.S. Pat. No. 4,167,153, the expense of hanging the support tubing and providing a drive spool for each of the lines on which the carriers are mounted would be substantial. U.S. Pat. Nos. 4,304,194 and 4,313,397 are very similar in nature to the massive supports taught in U.S. Pat. No. 4,167,153 and would be cost prohibitive for large modem poultry houses.

Accordingly, it would be desirable to provide a poultry agitator that would be operable to move poultry from away from the side walls of a poultry house having flow-through ventilation systems, and to provide a drive mechanism for the agitator mechanism that can be inexpensively installed and operated to provide a cost effective device for enhancing the growth and health of confined poultry.

SUMMARY OF THE INVENTION

It is an object of this invention to provide a poultry agitator that is operable to move poultry away from the side walls of a poultry house having a flow-through ventilation system.

It is another object of this invention to provide a poultry agitator structure that can be installed and operated in a cost effective manner to promote the health and growth of confined poultry.

It is still another object of this invention to provide a drive mechanism for a poultry agitator that is permits the agitator to be utilized in modem poultry houses.

It is an advantage of this invention that the drive mechanism permits the installation of a cost effective poultry agitator.

It is a feature of this invention that the poultry agitator does not require a substantial support beam for carrying the agitator members through the poultry house.

It is another advantage of this invention that the agitator carrier does not have to support the drive mechanism.

It is another feature of this invention that the drive mechanism is positionable in a conveniently accessible corner of the poultry house while being operable to cause movement of the agitator carrier along the length of the poultry house side walls.

It is still another advantage of this invention that the single drive mechanism is operable to effect simultaneous movement of two agitator carriers along opposing side walls of the poultry house from a single location.

It is still another object of this invention to provide a cost effective poultry agitator that will enable poultry growers to install and operate the agitator to maximize profits.

It is yet another feature of this invention that the agitator structure utilizes hangers spaced along the length of travel of the agitator members to support a flexible cable entrained around a drive wheel to cause the cable to circulate around the circumference of the poultry house.

It is yet another advantage of this invention that the agitator encourages the poultry to exercise, feed and intake water, thus promoting the health of the birds being confined in the poultry house.

It is still another feature of this invention that the agitator mechanism is operated by a programmable control apparatus that is easy to program and utilize.

It is a further feature of this invention that the agitator structure includes a mechanism that operates to reverse the direction of operation of the drive wheel to return the agitator members to a home position.

It is yet another object of this invention to provide a poultry agitator that is durable in construction, inexpensive to manufacture, carefree in maintenance, easy to assemble, and simple and effective in use.

These and other objects, features and advantages are accomplished according to the instant invention by providing a poultry agitator that is operable for use in conjunction with long rectangular confined poultry houses equipped with a flow-through ventilation system. The agitator mechanism imitates the action of a human moving through a congregation of birds to encourage the birds to exercise, feed and intake water. The agitator mechanism is formed as a continuous cable that is supported in a circumferential route around the poultry house. The cable is entrained around a drive wheel that is operable to circulate the flexible cable and the agitator members attached thereto. A stop mechanism halts the movement of the agitator near the end of the building and effects a reversal of the direction of operation of the drive wheel to cause the agitator to be returned to the initial home position. The cable is supported from spaced hangers without the need for massive support beam structure to carry the agitator along its path of travel along the side walls of the poultry house. The agitator member is clamped on the cable to move therewith. The agitator is formed as an elongated frame having a target supported near the floor of the poultry house. A programmable control is operable to time the movement of the agitator without operator intervention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Referring now to FIGS. 1–9, the details of a poultry agitator operable in a poultry house equipped with an end-toend flow through ventilation can best be seen. The poultry building 10 where the birds are confined is typically formed in a long rectangular shape. Such buildings 10 can be about 500 feet long and only about 40 to 45 feet wide. In this long rectangular building 10 as many as 30,000 birds can be housed. The end walls 12 of such buildings 10 are often equipped with ventilation openings 13 through which fans (not shown) draw or push air from one end of this long building 10 to the other. This air flow moves through the central part of the building 10 often causing the birds confined therein to move toward the side walls 15 away from the moving air. The building 10 is also provided with watering mechanisms 16 and feeding apparatus 17 extending longitudinally thorough the building 10, but transversely spaced along the width. The building 10 can also include an office area 11 that is restricted from access by the birds.

Figure 1:
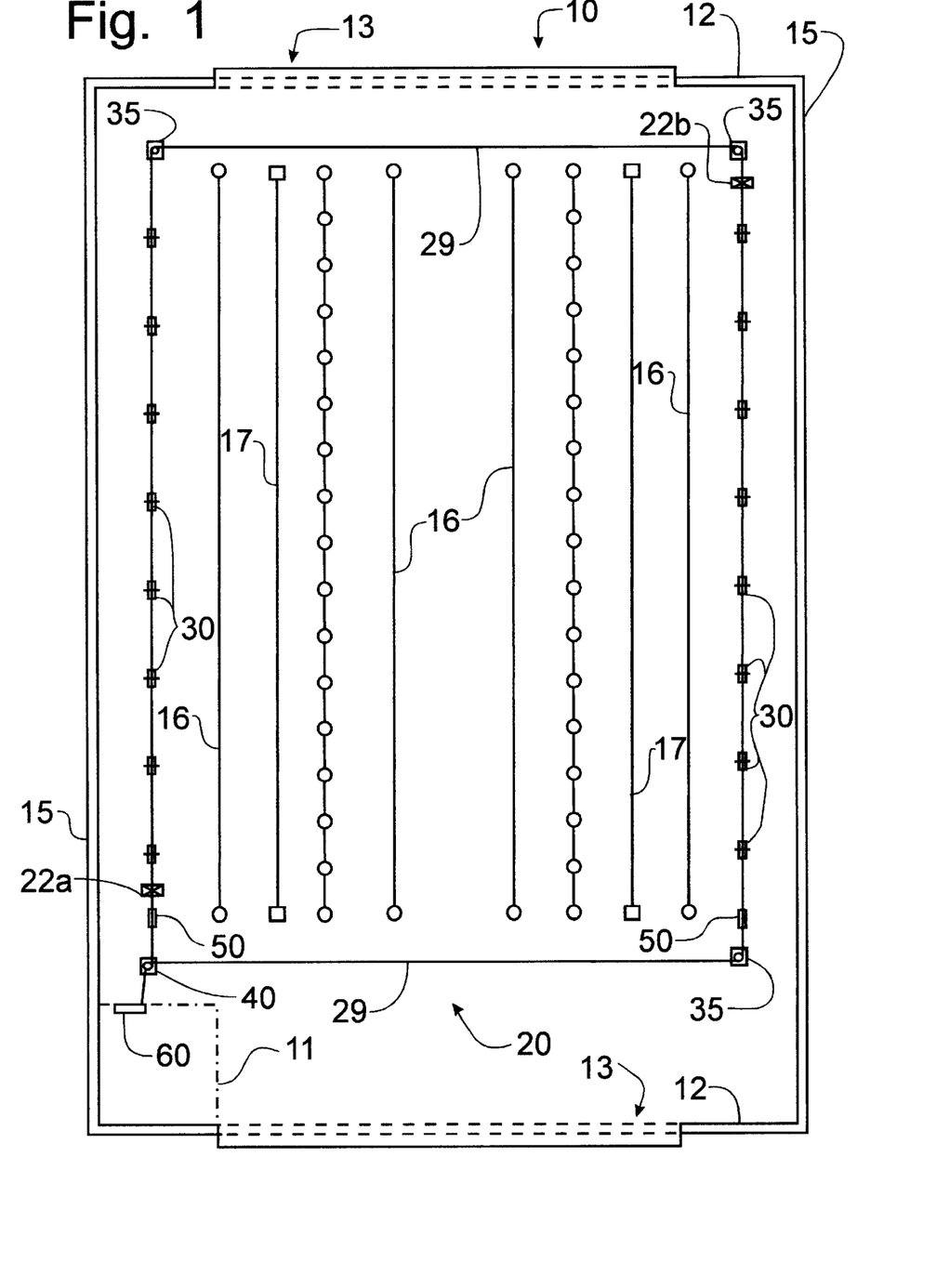
FIG. 1 is a schematic cross-sectional view of a confined poultry house having a poultry agitator incorporating the principles of the instant invention operable therein.

With the birds congregating adjacent the side walls 15, the birds do not take advantage of their access to the feed or water. Other problems are associated with the congregation of the birds along the side walls. The birds cannot be active because there are too many birds in a small area for them to be able to move around. Inactive birds become sick, complicated by an inadequate consumption of food and water. In addition, the congregation of the birds along the side walls 15 causes a high concentration of heat where these birds are collected. If an exceedingly large number of birds congregate in one location, the birds will also suffocate from a lack of oxygen, complicated by excessive ambient temperatures.

Accordingly, one skilled in the art will recognize the importance of keeping the confined birds active without allowing the birds to migrate toward the side walls 15 of the building 10. It is known that poultry that is raised in confined buildings 10 have tendencies to become stagnant due to the crowded conditions within the building 10. As a result, the birds tend to localize in one location, sitting in the same spot for hours at a time until hunger or thirst motivates them to move toward the feeders 17 or the watering mechanism 16. This lack of exercise leads to deteriorating health, thus reducing the profit from the poultry operation. It will also be recognized by one skilled in the art that a human walking thorough the building 10 will cause the birds to become more active. Thus, it would be desirable to provide a mechanical device that is capable of simulating the movement of a human through the building 10 to keep the birds moving and active. Any birds passing by the watering mechanism 16 or the feeding apparatus 17 will often stop to partake. This promotes greater weight gains in the birds.

Figure 7:
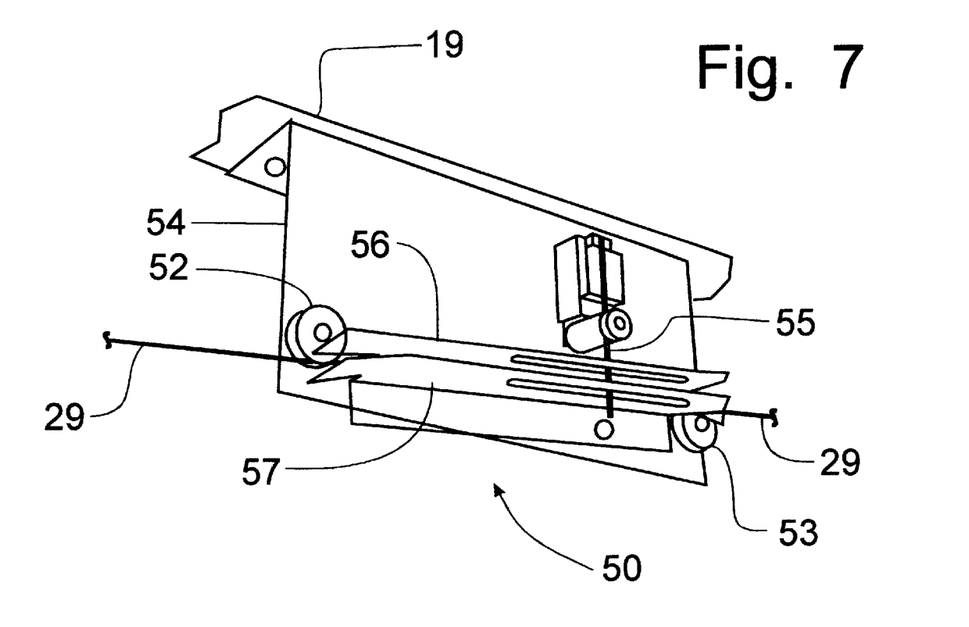
FIG. 7 is a side elevational perspective view of the stop mechanism position near the end of each fore-and-aft run of the agitator to stop the movement of the agitator and to cause the drive mechanism to reverse direction of operation and allow the agitator to return to a home position.
Figure 8:
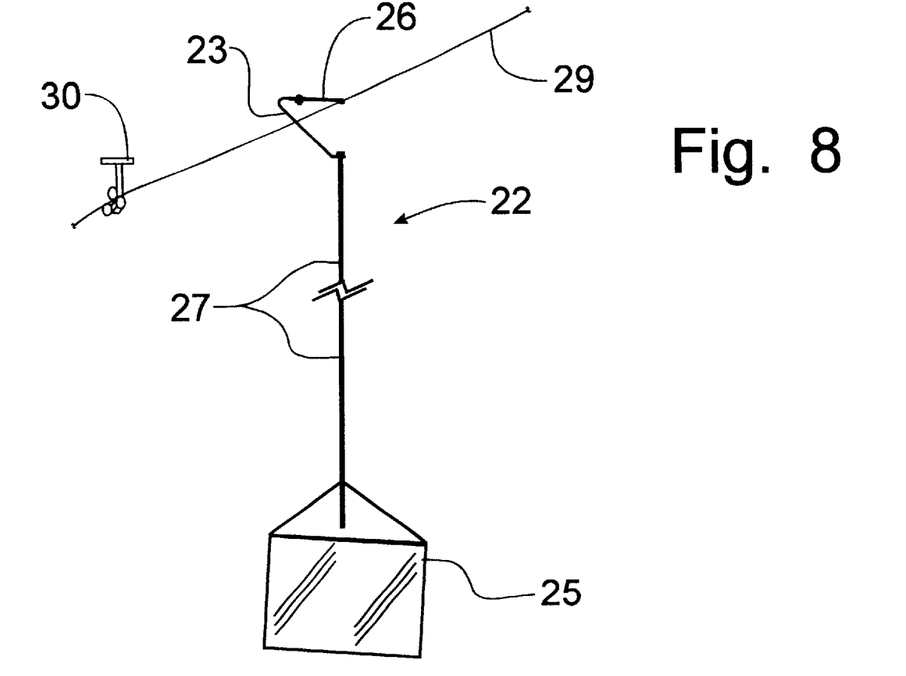
FIG. 8 is a schematic perspective view of the agitator member mounted on a cable suspended from the ceiling of the poultry house, a portion of the support member for said banner being broken away for purposes of clarity.
Figure 9:
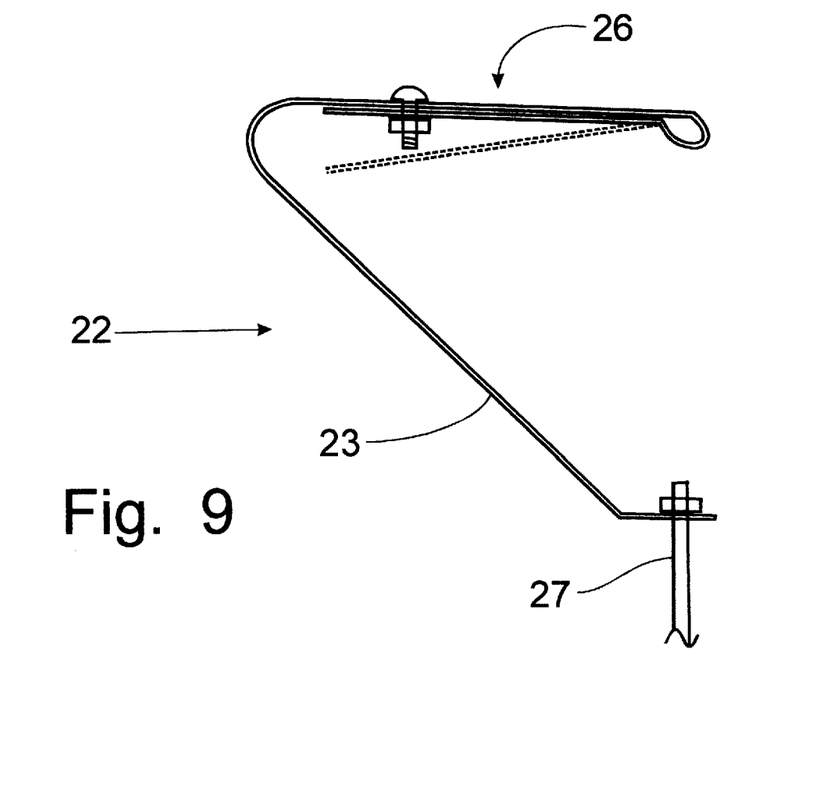
FIG. 9 is an enlarged side elevational view of the frame and clamping mechanism for the agitator member shown in FIG. 8, the movement of the clamping device being shown in phantom.

An agitator mechanism 20 for simulating the movement of a human through the building 10 is schematically depicted in FIG. 1 with the components being depicted in greater detail in FIGS. 2–9. The agitator mechanism 20 includes an agitator member 22 that is movable along the side walls 15 of the building 10 from one end to the other to encourage the birds to move away from the side walls 15 toward the watering mechanism 16 and feeding apparatus 17. The agitator member 22 is best seen in FIGS. 8 and 9 and includes a frame 23 that carries a banner or flag 25 that will cause the birds to move out of the way of the agitator member 22, but not be injured by it. The banner 25 is preferably made of cloth and is preferably colored white which is a color that keeps the birds calm. It is known that certain colors, such as black, will cause poultry to become excited and unsettled.

Figure 4:
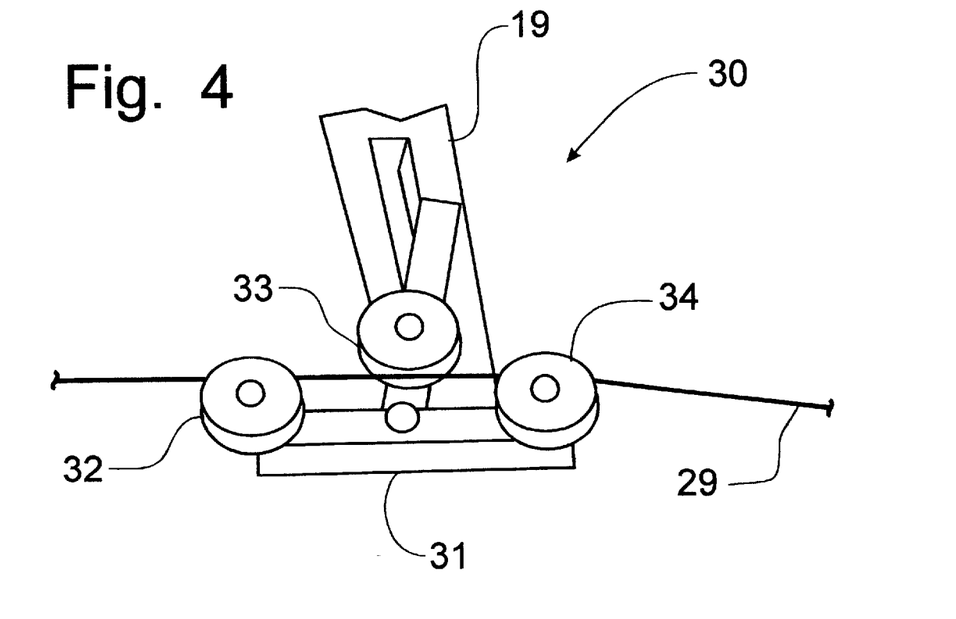
FIG. 4 is a lower perspective view of a hanger supporting the flexible cable along the circumferential route thereof.

The agitator members 22 are connected to an endless cable 29 and suspended therefrom. Preferably, the frame 23 includes a clamping device 26 that fixes the frame 23 to the cable 29, but in a manner that the agitator member 22 can be selectively detached from the cable for service and or repair. Preferably, the frame 23 is mounted on the cable 29 in such a manner that a twisting of the cable 29 will not cause the agitator member 22 to hang crookedly. The banner 25 can be attached to a support member 27 depending downwardly from the frame 23. The support member 27 can be a threaded rod that is adjustable in length hanging downwardly from the frame 23, or a flexible member, such as a rope. The cable 29 is suspended from a ceiling support 19 of the building 10 by a series of holders 30 that are spaced an appropriate distance apart, such as approximately forty feet apart. As best seen in FIG. 4, each holder 30 is constructed with a frame 31 that is detachably connected to the elevated support 19. The holder frame 31 rotatably supports three pulleys 32–34 that are arranged in a linear manner to engage the cable 29. The two bottom pulleys 32, 34 serve to support the cable 29 in its elevated position, while the upper and middle pulley 33 creates some tension in the cable 29 by deflecting the cable 29 downwardly between the two bottom pulleys 32, 34. Preferably, the upper, middle pulley 33 is mounted for positional adjustment to vary the tension created in the cable 29.

As can be seen best in FIG. 1, the cable 29 is preferably positioned in a circumferential manner extending along the exterior walls 12, 15 of the building 10. Along the length of the cable 29 extending along any particular wall 12, 15, the cable 29 is supported by the hangers 30. At the corners of the building 10, the cable 29 must make a turn to be able to follow the line of the walls. Accordingly, a corner holder 35 is provided at the three corners of the building 10, excluding the fourth corner where the drive mechanism 40 is positioned. The corner holders 35 are shown in greater detail in FIG. 6 and include a support frame 36 detachably connected to the ceiling support 19. The support frame 36 rotatably supports a pair of orthogonally oriented guide pulleys 37, 38 and a horizontally oriented turn pulley 39 around which the cable 29 passes to change direction 90 degrees. The guide pulleys 37, 38 serve to guide the cable 29 into the turn pulley 39 from either side thereof.

Figure 2:
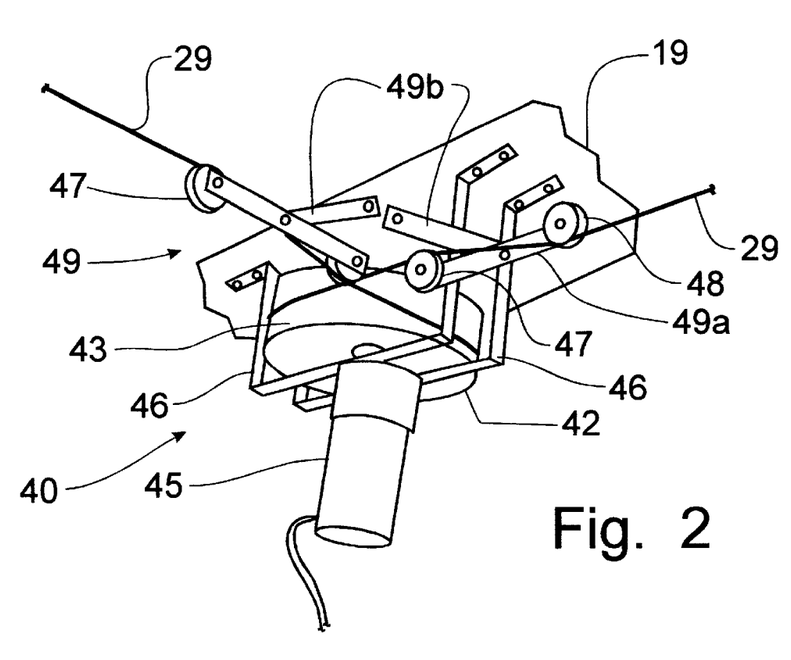
FIG. 2 is lower perspective view of a first embodiment of the drive mechanism effecting movement of the flexible cable along its circumferential route.
Figure 3:
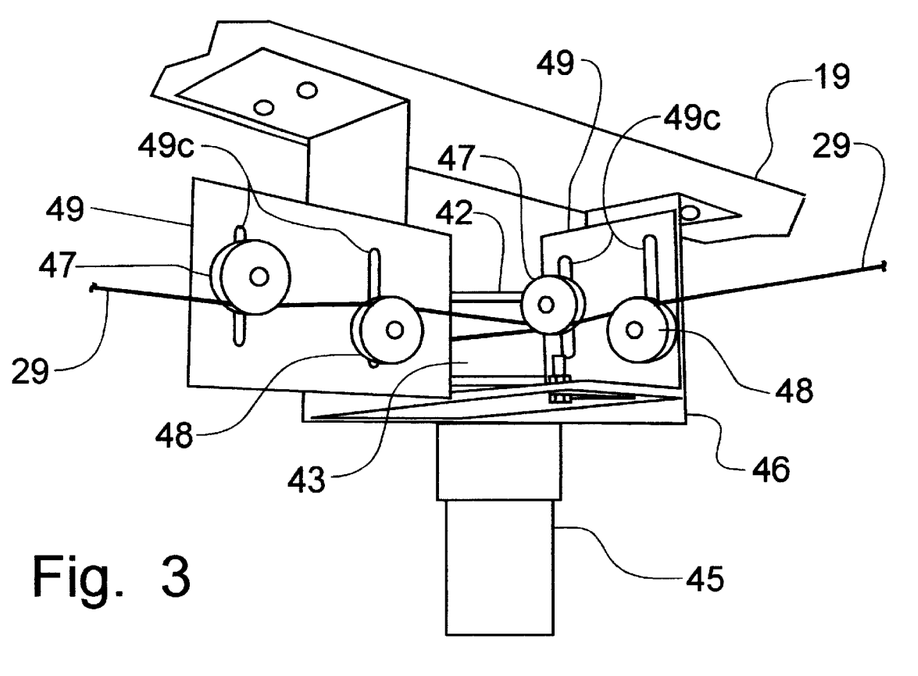
FIG. 3 is a side elevational perspective view of a second embodiment of the drive mechanism incorporating the principles of the instant invention.

A drive mechanism 40 for the agitator mechanism 20 is located at the fourth corner of the building 10, i.e. the corner of the building 10 where a corner holder 35 is not located. As best seen in FIGS. 2 and 3, the drive mechanism 40 includes a horizontally oriented drive wheel 42, preferably having a friction surface 43, such as rubber, affixed or bonded thereto. The drive wheel 42 is operably driven in rotation by a motor 45, preferably electric, positioned beneath the drive wheel 42 and connected thereto. The motor 45 is supported by a mounting bracket 46 connected to the ceiling support 19. The cable 29 is entrained around the drive wheel 42 in a looped or crossing fashion to provide a maximum engagement between the cable 29 and the friction surface 43 on the drive wheel 42 for powering the movement of the cable 29. The drive mechanism 40 is provided with guide pulleys 47, 48 mounted on a support bracket 49 at each opposing lead of the cable 29 into the drive wheel 42. The guide pulleys 47, 48 are arranged in orthogonally oriented pairs to support the cable 29, to direct properly the cable 29 into the drive wheel 42, and to provide a little tension into the cable 29. Tension is inserted by directing the cable 29 over top of one guide pulley 47 of each pair and then beneath the other guide pulley 48. The guide pulleys being oriented to place a bend in the cable 29 as it passes through the pulleys 47, 48.

FIGS. 2 and 3 provide alternative embodiments for the mounting of the guide pulleys 47, 48. In the embodiment of FIG. 2, the guide pulleys 47, 48 are mounted on a bar 49*a* that is adjustably connected to a hanger bracket 19. The rotation of the bar 49*a* relative to the hanger bracket 49*b* effecting an alignment of the guide pulleys 47, 48 to place tension into the cable 29. In the second embodiment of FIG. 3, the guide pulleys 47, 48 are mounted in slots 49*c* formed in the support bracket 49 so as to be individually positionably adjusted relative to one another in order to place tension into the cable 29. Furthermore, the support bracket 49 can be positionally mounted on the mounting bracket 46 for the drive wheel 42 so as to provide some positional flexibility for orienting the guide pulleys 47, 48 to best direct the cable 29 onto the drive wheel 42.

Another component of the agitator mechanism 20 is the stop apparatus 50. One stop apparatus 50 is located along each of the side walls 15 in engagement with the cable 29 to halt the movement of the cable 29 before the agitator member 22 comes into engagement with the corner holder 35. Since the drive mechanism 40 is reversible with respect to the direction of operation, one such stop apparatus 50 is positioned for engagement by the agitator member 22 when moving in either opposing direction. The stop apparatus 50 is best seen in FIG. 7. A pair of guide pulleys 52, 53 are mounted on a mounting bracket 54 to guide the cable through the stop apparatus 50. A pair of vertically opposed guide plates 56, 57 extend between the two guide pulleys 52, 53 to capture the frame 23 of the agitator member 22 and direct the frame 23 into engagement with a stop switch 55, which serves to stop the operation of the drive wheel 42 and reverse the direction of operation thereof.

Figure 5:
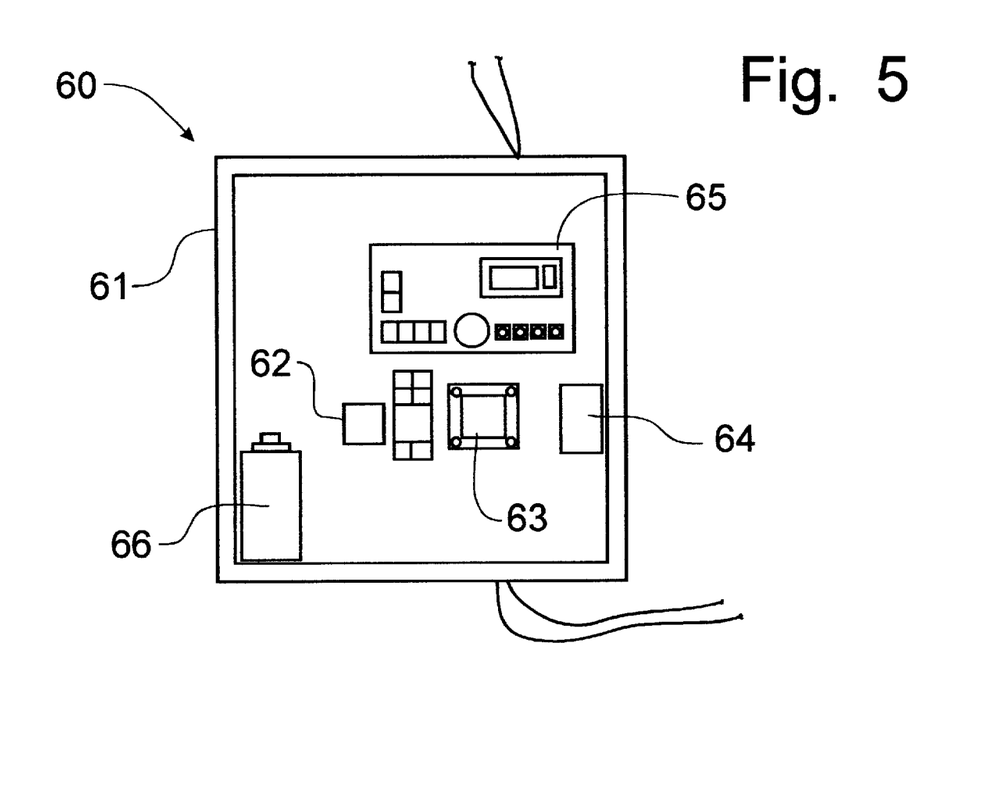
FIG. 5 is a schematic elevational view of the control box for programing the operative control of the agitator operation.
Figure 6:
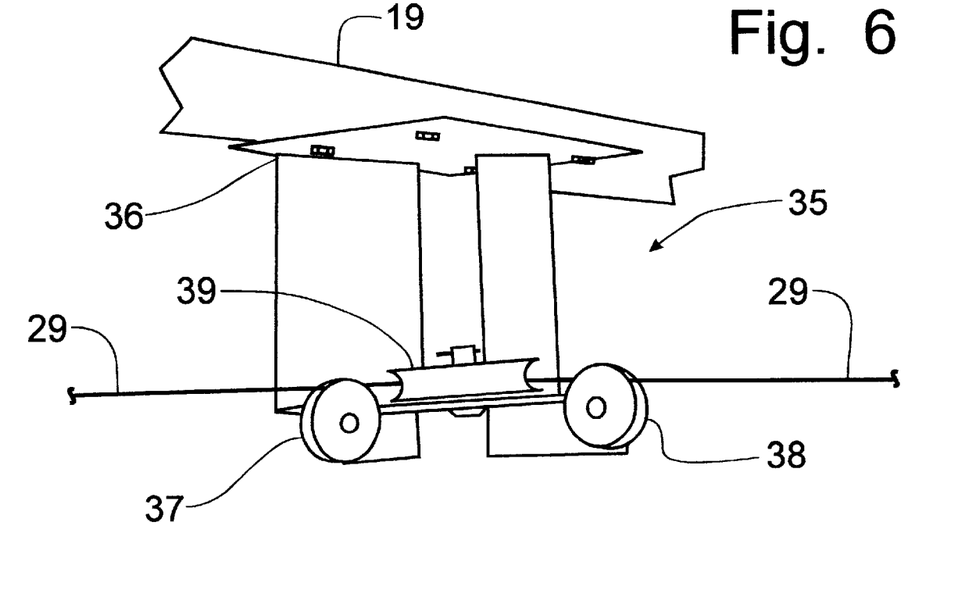
FIG. 6 is a side elevational perspective view of a corner hanger for the flexible cable to enable the flexible cable to extend to the opposing side of the poultry house and form its circumferential route.

The control mechanism 60 is preferably located in the office area II and includes a control panel 61 housing a pair of relays 62, 63 that trip the drive motor 45 off when the agitator frame 23 engages the stop switch 55. The relays 62, 63 then trip a flip-flop switch 64 that reverses the AC power to set the drive motor 45 to run in the opposite direction than just prior to the engagement of the frame 23 with the stop switch 55, when the next signal is received from the timer 65. The control mechanism further includes a capacitor 66 for starting the drive motor 45. The timer 65 can be set to trigger the operation of the agitator mechanism 20 at any desired time interval.

In the specific embodiment depicted in the drawings, the motor 45 is a ⅙ HP reversible electric motor operating on AC current with a shaft output of 31 RPM. The drive wheel 42 has a ⅝ inch hub that fits on the output shaft of the motor 45. The cable 29 is a 3/32 inch diameter wire cable that wraps around the drive wheel 42 wrapped with a rubber sleeve to provide better friction for driving the movement of the cable 29. The cable is positioned about four feet from the side walls 15 of the building 10 and is spaced about 15 feet from the end walls 12. The height of the cable 29 is positioned to move the agitator banner 25 just above the floor of the building to encourage movement of the birds within the building 10. In FIGS. 8 and 9, the frame 23 of the agitator mechanism 20 is shown as being clamped onto the cable 29; however, other means for attaching the frame 23 to the cable 29 are available, including the use of a crimp that is fixed by epoxy to the frame 23, but left loose on the cable 29.

In operation, the operator sets the timer 65 for actuation of the agitator mechanism 20 at the desired time intervals or at a desired time. At the selected time for actuation, the electric motor 45 is energized and starts rotating the drive wheel 42. Assuming that the agitator member 22*a* on the same side of the building 10 as the drive mechanism 40 starts out next to the drive mechanism 40, the opposing agitator member 22*b* will be starting out at the diagonally opposite corner of the building 10, as shown in FIG. 1. The drive wheel 42 is then rotated in a direction to move the adjacent agitator member 22*a* toward the far end wall 12 of the building 10, relative to the drive mechanism 40. Since the cable 29 is an endless loop around the circumference of the building 10, the opposing agitator member 22*b* is moved toward the end wall 12 nearest the drive mechanism 40.

The electric motor 45 keeps driving the movement of the cable 29 until the opposing agitator member 22b engages the stop apparatus 50. Engagement of the stop switch 55, stops the flow of current to the motor 45 and resets the flip-flop switch 64 to reverse the direction of operation of the motor 45. At this point, the timer 65 again controls the operation of the motor 45. When subsequently actuated, the motor 45 will then bring the adjacent agitator member 22a back toward the drive mechanism 40 and move the opposing agitator member 22b back toward the far end wall 12. This movement of the agitator member 22a, 22b will continue until the adjacent agitator member 22a engages the corresponding stop apparatus 50, whereupon the drive mechanism 40 will halt the flip-flop switch 55 is reset to again reverse the direction of operation of the motor 45.

It will be understood that other changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A poultry agitator to encourage the movement of birds within a poultry house having opposing ends walls and opposing side walls interconnecting said end walls to define an enclosure with a perimeter, comprising:
   an endless cable supported along a path oriented internally of the perimeter of the enclosure;
   first and second agitator members mounted on said cable at diagonally opposing positions, said agitator members being positioned to pass through said enclosure above a floor of said building;
   a drive mechanism for said endless cable to cause movement of said cable around said path and a corresponding movement of said agitator members, said drive mechanism including:
      a drive wheel engaged with said cable to effect a movement of said cable around said perimeter when operably rotated; and
      a motor operably connected to said drive wheel to drive the rotation thereof, said motor being reversible to change the direction of rotation of said drive wheel and a corresponding change in the direction of movement of said cable; and
   a control mechanism for controlling the operation of said motor, said control mechanism including a stop mechanism positioned for engagement with one of said agitator members to cause said motor to cease operation and to effect a reversing of the direction of operation thereof.

2. The poultry agitator of claim 1 wherein said cable is supported from holders spaced along said path.

3. The poultry agitator of claim 1 wherein said cable is engaged with said drive wheel in an overlapping manner to provide a substantially full circumferential engagement of said drive wheel by said cable.

4. The poultry agitator of claim 3 wherein said drive wheel includes a friction surface mounted on the circumference thereof for engagement with said cable.

5. The poultry agitator of claim 3 wherein each said holder is provided with guide pulleys that are engageable with said cable to induce tension into said cable.

6. The poultry agitator of claim 5 wherein said agitator members are movable only along said side walls, said stop mechanism being operable to prevent said agitator members from moving along said end walls.

7. The poultry agitator of claim 5 wherein said cable is turned in direction of movement by a corner holder, said stop mechanism being operable to prevent said agitator members from engaging said corner holders.

8. The poultry agitator of claim 7 wherein said control mechanism includes a timer for initiating the operation of said motor to effect movement of said agitator members at preselected time intervals.

9. The poultry agitator of claim 8 wherein said control mechanism further includes a second stop mechanism, one of said stop mechanisms being engageable with one of said agitator members when moving is a first direction, the second said stop mechanism being engageable with the other of said agitator members when moving is a second direction opposite to said first direction.

10. A method of operating a poultry agitator for moving poultry within a confined building including side walls and end walls, said poultry agitator having an endless cable supported along a path oriented internally of the perimeter of the enclosure; first and second agitator members mounted on said cable at diagonally opposing positions, said agitator members being positioned to pass through said enclosure above a floor of said building; a drive mechanism for said endless cable to cause movement of said cable around said path and a corresponding movement of said agitator members, said drive mechanism; and a control mechanism for controlling the operation of said drive mechanism, comprising the steps of:
   operating said drive mechanism in a first direction to move said cable along said path and, thereby, move said agitator members along said side walls of said building in first opposing directions;
   halting said drive mechanism when said agitator members approach said opposing end walls before said agitator members move along said end walls;
   reversing the direction of operation of said drive mechanism;
   subsequently operating said drive mechanism in a second direction to move said cable along said path and, thereby, move said agitator members along said side walls in second opposing directions; and
   stopping said drive mechanism when said agitator members approach said opposing end walls before said agitator members move along said end walls.

11. The method of claim 10 wherein said halting and stopping steps include the step of engaging a stop mechanism by one of said agitator members to signal said control mechanism to cease operating said drive mechanism.

12. The method of claim 11 wherein said engaging step causes said control mechanism to effect said reversing step.

13. The method of claim 12 wherein said engaging step includes the step of activating a timer to delay said step of operating said drive mechanism for a preselected period of time.

14. In a poultry agitator for moving poultry within a confined building including side walls and end walls defining a perimeter of said building, the improvement comprising:
   an endless cable supported along a path oriented internally of the perimeter of the building;
   first and second agitator members mounted on said cable at diagonally opposing positions, said agitator members being positioned to pass through said enclosure above a floor of said building;

a drive mechanism engaged with said endless cable to cause movement of said cable around said path and a corresponding movement of said agitator members, and a control mechanism for controlling the operation of said drive mechanism to stop the movement of said agitator members and to control the direction of movement of said agitator members through said building in a predetermined manner for forcing said poultry to move within said building.

15. The poultry agitator of claim 14 wherein said drive mechanism comprises:

a drive wheel having said cable frictionally engaged therewith to effect a movement of said cable around said perimeter when said drive wheel is operably rotated; and a motor operably connected to said drive wheel to drive the rotation thereof.

16. The poultry agitator of claim 15 wherein said cable is engaged with said drive wheel in an overlapping configuration to provide engagement between said drive wheel and said cable substantially entirely around a circumference of said drive wheel.

17. The poultry agitator of claim 16 wherein said first and second agitator members are moved in opposing directions when said drive wheel is moving said cable around said perimeter, said control mechanism including a stop member engageable with one of said agitator members to stop the movement of said agitator members at a preselected location.

18. The poultry agitator of claim 17 wherein said control mechanism is operable to change the direction of rotation of said motor to reverse the direction of movement of said cable and said agitator members in response to the engagement of said stop member by one of said agitator members.

19. The poultry agitator of claim 18 further comprising:

a plurality of hangers supporting said cable in spaced-apart relationship around the path of said cable, each of said hangers having pulleys adjustably mounted for supporting said cable and for inducing tension into said cable;

a corner holder located on said path corresponding to each of three turns in direction of said path, said drive wheel being located at a fourth turn of said path;

a pair of said stop members positioned along said path such that one of said agitator members engages one of said stop members when moving in a first direction, and the other of said stop member engages the other of said agitator members when moving in a second direction opposite to said first direction.

\* \* \* \* \*